(12) United States Patent
Takagi

(10) Patent No.: US 12,510,600 B2
(45) Date of Patent: Dec. 30, 2025

(54) BATTERY DEGRADATION DETERMINATION SYSTEM, BATTERY DEGRADATION DETERMINATION APPARATUS, AND BATTERY DEGRADATION DETERMINATION METHOD

(71) Applicant: TOYOTA SYSTEMS CORPORATION, Nagoya (JP)

(72) Inventor: Atsushi Takagi, Toyota (JP)

(73) Assignee: TOYOTA SYSTEMS CORPORATION, Nagoya (JP)

( * ) Notice: Subject to any disclaimer, the term of this patent is extended or adjusted under 35 U.S.C. 154(b) by 324 days.

(21) Appl. No.: 17/969,136

(22) Filed: Oct. 19, 2022

(65) Prior Publication Data
US 2023/0400528 A1    Dec. 14, 2023

(30) Foreign Application Priority Data

Jun. 13, 2022  (JP) ................................ 2022-095019

(51) Int. Cl.
*G01R 31/392*  (2019.01)
*B60L 58/16*  (2019.01)
(Continued)

(52) U.S. Cl.
CPC ............ *G01R 31/392* (2019.01); *B60L 58/16* (2019.02); *G01R 31/3648* (2013.01);
(Continued)

(58) Field of Classification Search
CPC .............. G01R 31/392; G01R 31/3648; G01R 31/385; G01R 31/389; G01R 31/367;
(Continued)

(56) References Cited

U.S. PATENT DOCUMENTS 10,794,961 B2 *  10/2020  Matsumoto ............. B60L 58/12
2006/0186890 A1   8/2006  Iwane et al.
(Continued)

FOREIGN PATENT DOCUMENTS

EP     2551688 A1 *  1/2013 ......... G01R 31/3679
EP     3913726 A1    11/2021
(Continued)

*Primary Examiner* — Farhana A Hoque
*Assistant Examiner* — Joseph O Nyamogo
(74) *Attorney, Agent, or Firm* — Oliff PLC

(57) ABSTRACT

A battery degradation determination system includes a battery degradation determination apparatus configured to perform degradation determination for a secondary battery. The battery degradation determination apparatus includes a processor. The processor is configured to measure a charging and discharging characteristic value of the secondary battery; to calculate a first equivalent circuit constant in an equivalent circuit in which a power supply is a main tank circuit including a first resistive element and a first capacitive element that are connected in parallel, based on the measured charging and discharging characteristic value; and to perform the degradation determination for the secondary battery, based on at least the first equivalent circuit constant that is calculated.

14 Claims, 13 Drawing Sheets

(51) Int. Cl.

| | |
|---|---|
| *B60R 16/033* | (2006.01) |
| *G01R 31/36* | (2020.01) |
| *G01R 31/367* | (2019.01) |
| *G01R 31/382* | (2019.01) |
| *G01R 31/385* | (2019.01) |
| *G01R 31/389* | (2019.01) |
| *G01R 31/396* | (2019.01) |
| *H01M 10/44* | (2006.01) |
| *H01M 10/48* | (2006.01) |
| *H02J 7/00* | (2006.01) |

(52) U.S. Cl.
CPC ......... *G01R 31/367* (2019.01); *G01R 31/382* (2019.01); *G01R 31/385* (2019.01); *G01R 31/389* (2019.01); *G01R 31/396* (2019.01); *H01M 10/44* (2013.01); *H01M 10/48* (2013.01); *H02J 7/005* (2020.01); *B60R 16/033* (2013.01); *Y02E 60/10* (2013.01)

(58) Field of Classification Search
CPC ... G01R 31/382; G01R 31/396; H01M 10/44; H01M 10/48; Y02E 60/10; B60L 58/16; H02J 7/005; B60R 16/033
See application file for complete search history.

(56) References Cited

U.S. PATENT DOCUMENTS

| | | | |
|---|---|---|---|
| 2012/0150503 | A1 | 6/2012 | Haupt et al. |
| 2014/0005965 | A1* | 1/2014 | Vestama ............... H01M 10/48 |
| | | | 702/63 |
| 2014/0019787 | A1* | 1/2014 | Kurahashi ............. G06F 1/3212 |
| | | | 713/323 |
| 2014/0067344 | A1 | 3/2014 | Kawai et al. |
| 2014/0340045 | A1* | 11/2014 | Itabashi ............... G01R 31/389 |
| | | | 320/134 |
| 2016/0139207 | A1* | 5/2016 | Sano .................... G01R 31/367 |
| | | | 702/63 |
| 2018/0059190 | A1* | 3/2018 | Verbrugge ......... G01R 31/3842 |
| 2018/0246173 | A1 | 8/2018 | Singh et al. |
| 2019/0146038 | A1 | 5/2019 | Matsumoto et al. |

FOREIGN PATENT DOCUMENTS

| | | |
|---|---|---|
| JP | 2005-100969 A | 4/2005 |
| JP | 2011-085445 A | 4/2011 |
| JP | 2012-133757 A | 7/2012 |
| JP | 2014-048284 A | 3/2014 |
| JP | 2019-090684 A | 6/2019 |
| JP | 2020-112491 A | 7/2020 |
| JP | 2022-020404 A | 2/2022 |
| WO | 2022/093454 A1 | 5/2022 |

* cited by examiner

FIG. 8

| ts(S) | 0.05 | 0.4 | 0.9 |
|---|---|---|---|
| $\tau_0(S)$ | 3866.9 | 36536 | 71567 |
| $\tau_1(S)$ | 0.063632 | 0.93965 | 1.6926 |
| $\tau_2(S)$ | 0.0061280 | 0.12048 | 0.24380 |

BATTERY DEGRADATION DETERMINATION SYSTEM, BATTERY DEGRADATION DETERMINATION APPARATUS, AND BATTERY DEGRADATION DETERMINATION METHOD

CROSS-REFERENCE TO RELATED APPLICATION

This application claims priority to Japanese Patent Application No. 2022-095019 filed on Jun. 13, 2022, incorporated herein by reference in its entirety.

BACKGROUND

1. Technical Field

The disclosure relates to a battery degradation determination system, a battery degradation determination apparatus, and a battery degradation determination method that can perform degradation determination for a secondary battery quickly and efficiently.

2. Description of Related Art

With rapid electrification of vehicles in these days, there is rising demand for secondary batteries for vehicles, and with such circumstances, there is also increasing need for reuse of secondary batteries. When a vehicle is retired, a secondary battery is extracted from the vehicle and sent to a recycling company, and the recycling company performs degradation determination for the secondary battery. When it is determined that the secondary battery is reusable as a result of the degradation determination, the secondary battery is rebuilt and used on a secondhand market.

Therefore, there has been a technique for performing degradation determination for a secondary battery. For example, Japanese Unexamined Patent Application Publication No. 2022-020404 discloses a technique in which a side-reaction current in a negative electrode of a secondary battery during a travel period is measured based on a value obtained by subtracting an amount of electricity used during the travel period and a remaining capacity after the travel period from a previous full-charge capacity; a coating amount is estimated based on the side-reaction current in the negative electrode; and a state of degradation of the secondary battery is determined based on the coating amount.

SUMMARY

However, the technique according to JP 2022-020404 A is configured to perform degradation determination at a charger, needs to acquire an amount of electricity used during a travel period and a remaining capacity after the travel period, and is therefore unable to be used when a recycling company performs degradation determination for a secondary battery. Accordingly, the recycling company has no choice but to fully charge and then discharge a secondary battery to acquire charging and discharging characteristics, and then perform degradation determination based on the charging and discharging characteristics, and a large amount of time is required to acquire such charging and discharging characteristics.

The disclosure provides a battery degradation determination system, a battery degradation determination apparatus, and a battery degradation determination method that can perform degradation determination for a secondary battery quickly and efficiently.

A first aspect of the disclosure relates to a battery degradation determination system. The battery degradation determination system includes a battery degradation determination apparatus configured to perform degradation determination for a secondary battery. The battery degradation determination apparatus includes a processor. The processor is configured to measure a charging and discharging characteristic value of the secondary battery; calculate a first equivalent circuit constant in an equivalent circuit in which a power supply is a main tank circuit including a first resistive element and a first capacitive element that are connected in parallel, based on the measured charging and discharging characteristic value; and perform the degradation determination for the secondary battery, based on at least the first equivalent circuit constant that is calculated.

In the aspect, the battery degradation determination apparatus may further include a storage section that stores a second equivalent circuit constant obtained prior to shipment of the secondary battery; and the processor may be configured to perform the degradation determination for the secondary battery, based on the first equivalent circuit constant that is calculated and the second equivalent circuit constant that is stored in the storage section.

In the aspect, the equivalent circuit may have a circuit configuration in which the main tank circuit, a second resistive element, and a plurality of sub-tank circuits are connected in series, each of the plurality of sub-tank circuits including a third resistive element and a second capacitive element that are connected in parallel.

In the aspect, the first equivalent circuit constant may include a resistance value of the first resistive element, a capacitance value of the first capacitive element, a resistance value of the second resistive element, a resistance value of the third resistive element, and a capacitance value of the second capacitive element.

In the aspect, the processor may be configured to measure a plurality of charging and discharging characteristic values by using a plurality of different sampling time intervals, and to calculate the first equivalent circuit constant that changes with time, based on the plurality of charging and discharging characteristic values.

In the aspect of the disclosure, the processor may perform the degradation determination for the secondary battery, based on whether or not a difference between the first equivalent circuit constant and the second equivalent circuit constant is greater than a predetermined threshold value.

A second aspect of the disclosure relates to a battery degradation determination apparatus configured to perform degradation determination for a secondary battery. The battery degradation determination apparatus includes a processor. The processor is configured to measure a charging and discharging characteristic value of the secondary battery; calculate a first equivalent circuit constant in an equivalent circuit in which a power supply is a main tank circuit including a first resistive element and a first capacitive element that are connected in parallel, based on the measured charging and discharging characteristic value; and perform the degradation determination for the secondary battery, based on at least the first equivalent circuit constant that is calculated.

A third aspect of the disclosure relates to a battery degradation determination method for a battery degradation determination system including a battery degradation determination apparatus configured to perform degradation determination for a secondary battery. The battery degradation determination method includes measuring, by the battery degradation determination apparatus, a charging and discharging characteristic value of the secondary battery; calculating, by the battery degradation determination apparatus, a first equivalent circuit constant in an equivalent circuit in which a power supply is a main tank circuit including a first resistive element and a first capacitive element that are connected in parallel, based on the measured charging and discharging characteristic value; and performing, by the battery degradation determination apparatus, the degradation determination for the secondary battery, based on at least the first equivalent circuit constant that is calculated.

According to the aspects of the disclosure, degradation determination can be performed for a secondary battery quickly and efficiently.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 shows an example of equivalent circuit constants based on values measured by using the different sampling time intervals $t_S$;

DETAILED DESCRIPTION OF EMBODIMENTS

Hereinafter, a battery degradation determination system, a battery degradation determination apparatus, and a battery degradation determination method according to an embodiment of the disclosure is described in detail based on the drawings.

Outline of Battery Degradation Determination System

Figure 1:
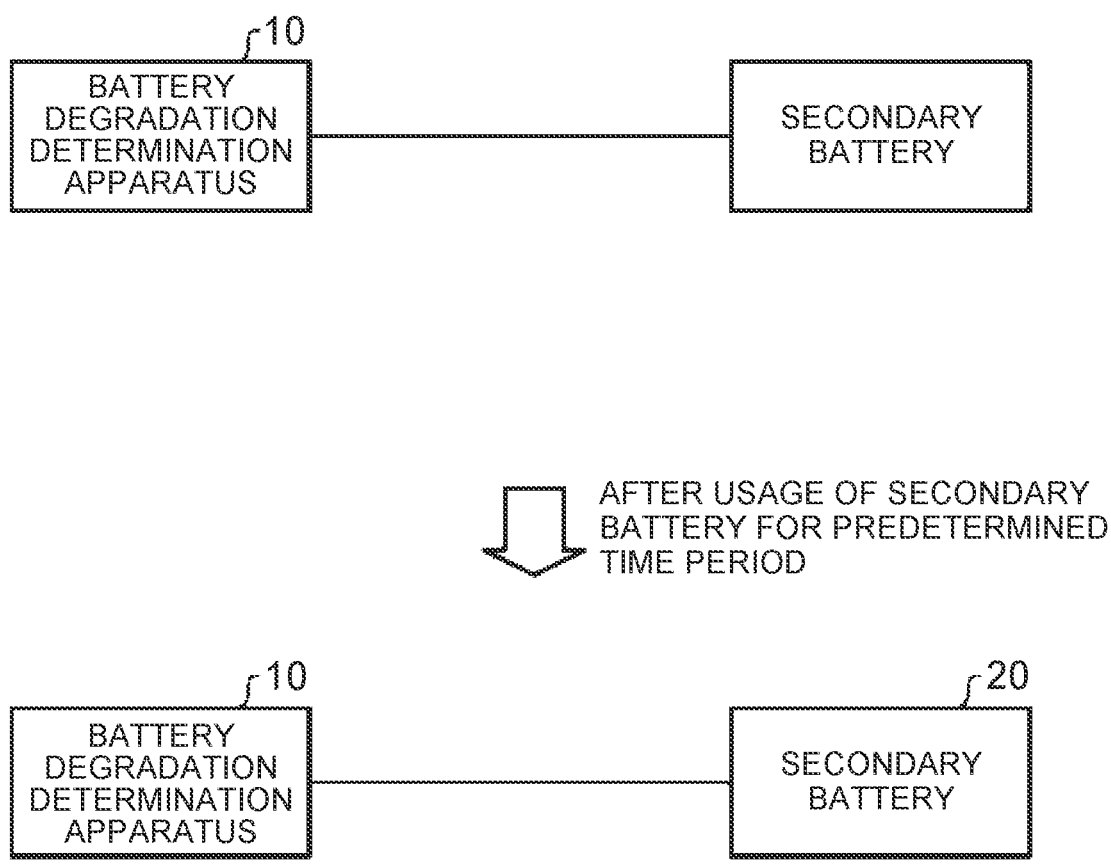
FIG. 1 is an explanatory diagram for describing an outline of a battery degradation determination system according to an embodiment.

First, an outline of the battery degradation determination system according to the embodiment is described. FIG. 1 is an explanatory diagram for describing the outline of the battery degradation determination system according to the embodiment. As shown in FIG. 1, the battery degradation determination system, by using the battery degradation determination apparatus 10, measures charging and discharging characteristics of a new secondary battery, and calculates an initial equivalent circuit constant for the new secondary battery, based on the measured charging and discharging characteristics of the secondary battery, and stores the initial equivalent circuit constant for the new secondary battery.

Thereafter, by using the battery degradation determination apparatus 10, charging and discharging characteristics of the secondary battery 20 after usage for a predetermined time period are measured, and an equivalent circuit constant for the secondary battery 20 after usage for the predetermined time period is calculated and stored. The battery degradation determination apparatus 10 compares the initial equivalent circuit constant stored beforehand with the equivalent circuit constant for the secondary battery 20 after usage for the predetermined time period, and determines degradation of the secondary battery 20 (i.e., determines whether the secondary battery 20 is degraded), based on a change in equivalent circuit constant.

Specifically, when the change in equivalent circuit constant is equal to or less than a predetermined threshold value, it is determined that the secondary battery 20 is not degraded (good), and when the change in equivalent circuit constant is greater than the predetermined threshold value, it is determined that the secondary battery 20 is degraded (defective).

System Configuration of Battery Degradation Determination System

Figure 2:
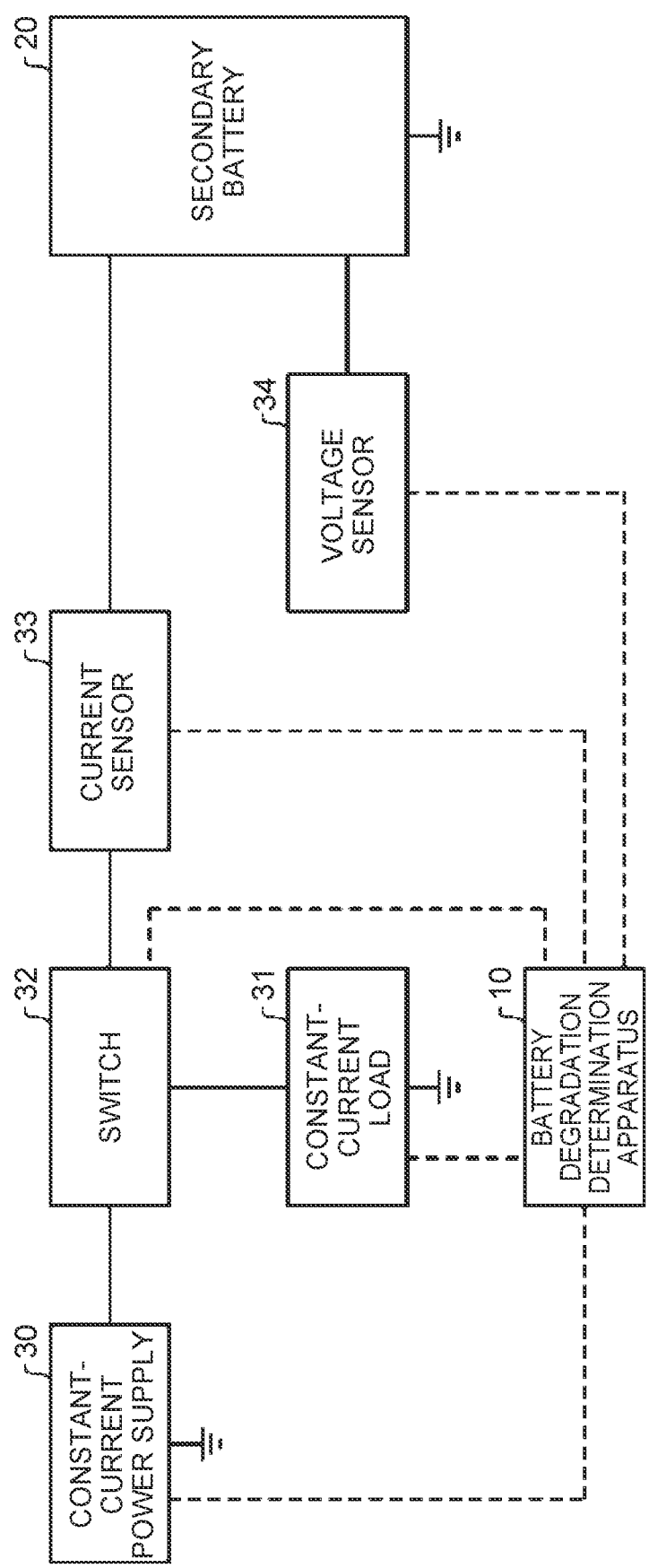
FIG. 2 shows a system configuration of the battery degradation determination system.

Next, a system configuration of the battery degradation determination system is described. FIG. 2 shows the system configuration of the battery degradation determination system. As shown in FIG. 2, in the battery degradation determination system, a constant-current power supply 30, a constant-current load 31, a switch 32, a current sensor 33, and a voltage sensor 34 are connected to the battery degradation determination apparatus 10. The battery degradation determination system measures charging and discharging characteristics of the secondary battery 20, calculates an equivalent circuit constant based on the measured charging and discharging characteristics, and determines that the secondary battery 20 is not degraded when a change of the calculated equivalent circuit constant from the initial equivalent circuit constant is equal to or less than the predetermined threshold value, and determines that the secondary battery is degraded when the change of the equivalent circuit constant is greater than the predetermined threshold value.

The secondary battery 20 is a battery that can be used repeatedly by repeating charge and discharge, and is, for example, a nickel metal hydride battery or the like. The constant-current power supply 30 is a power supply that applies a constant current when the secondary battery 20 is charged. The constant-current load 31 is a load apparatus that performs discharge by allowing a constant current to flow when the secondary battery 20 is discharged.

The switch 32 is a switch that changes a connection state in such a manner as to connect the constant-current power supply 30 to the secondary battery 20 when the secondary battery 20 is charged, and to connect the constant-current load 31 to the secondary battery 20 when the secondary battery 20 is discharged. The current sensor 33 is a sensor that measures a current flowing into the secondary battery 20 from the constant-current power supply 30, and a current flowing out of the secondary battery 20 to the constant-current load 31. The voltage sensor 34 is a voltage sensor that measures a terminal voltage of the secondary battery 20.

Specifically, as shown in FIG. 2, the battery degradation determination apparatus 10 initializes settings by powering on each of the constant-current power supply and the constant-current load 31. The battery degradation determination apparatus 10 controls the switch 32 to connect the constant-current power supply 30 to the secondary battery 20, and the secondary battery 20 is charged. The battery degradation determination apparatus 10 measures a current flowing into the secondary battery 20 during charge of the secondary battery 20 by using the current sensor 33 and stores a measured value, and also acquires data on the terminal voltage during charge of the secondary battery 20 from the voltage sensor 34 and stores the acquired data.

Then, the battery degradation determination apparatus 10 controls the switch 32 to connect the secondary battery 20 to the constant-current load 31, and the secondary battery 20 is discharged. The battery degradation determination apparatus 10 measures a current flowing out of the secondary battery 20 during discharge of the secondary battery 20 by using the current sensor 33 and stores a measured value, and also acquires data on the terminal voltage during discharge of the secondary battery 20 from the voltage sensor 34 and stores the acquired data.

Thereafter, the battery degradation determination apparatus 10 calculates an equivalent circuit constant from the data on the terminal voltage with respect to time during charge and discharge of the secondary battery 20. The battery degradation determination apparatus 10 compares the calculated equivalent circuit constant with the initial equivalent circuit constant for the secondary battery 20 that is stored beforehand, and, when a change in equivalent circuit constant is equal to or less than the predetermined threshold value, determines that the secondary battery 20 is good, and, when the change in equivalent circuit constant is greater than the predetermined threshold value, determines that the secondary battery 20 is defective.

Equivalent Circuit for Secondary Battery 20

Figure 3:
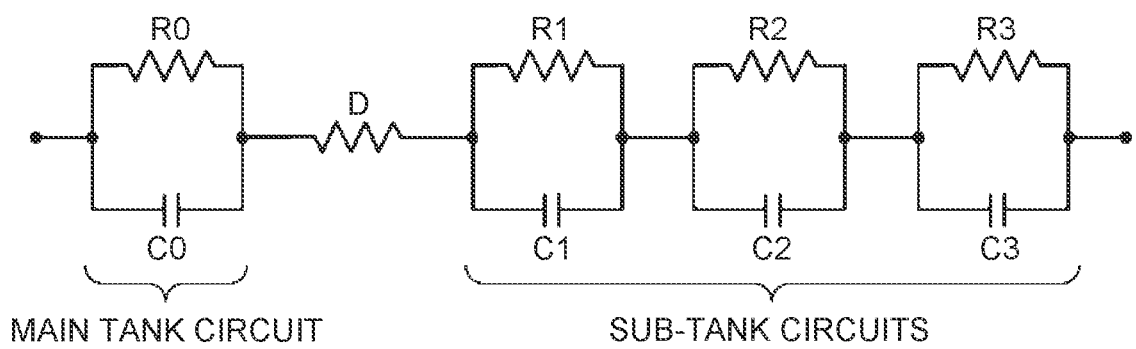
FIG. 3 shows an example of an equivalent circuit for a secondary battery shown in FIG. 2.

Next, an equivalent circuit for the secondary battery 20 is described. FIG. 3 shows an example of the equivalent circuit for the secondary battery 20 shown in FIG. 2. As shown in FIG. 3, the equivalent circuit includes a main tank circuit including a resistive element R0 and a capacitive element C0 that are connected in parallel; a resistive element D; a first sub-tank circuit including a resistive element R1 and a capacitive element C1 that are connected in parallel; a second sub-tank circuit including a resistive element R2 and a capacitive element C2 that are connected in parallel; and a third sub-tank circuit including a resistive element R3 and a capacitive element C3 that are connected in parallel. The main tank circuit, the resistive element D, and the first to third sub-tank circuits are connected in series.

Configuration of Battery Degradation Determination Apparatus 10

Figure 4:
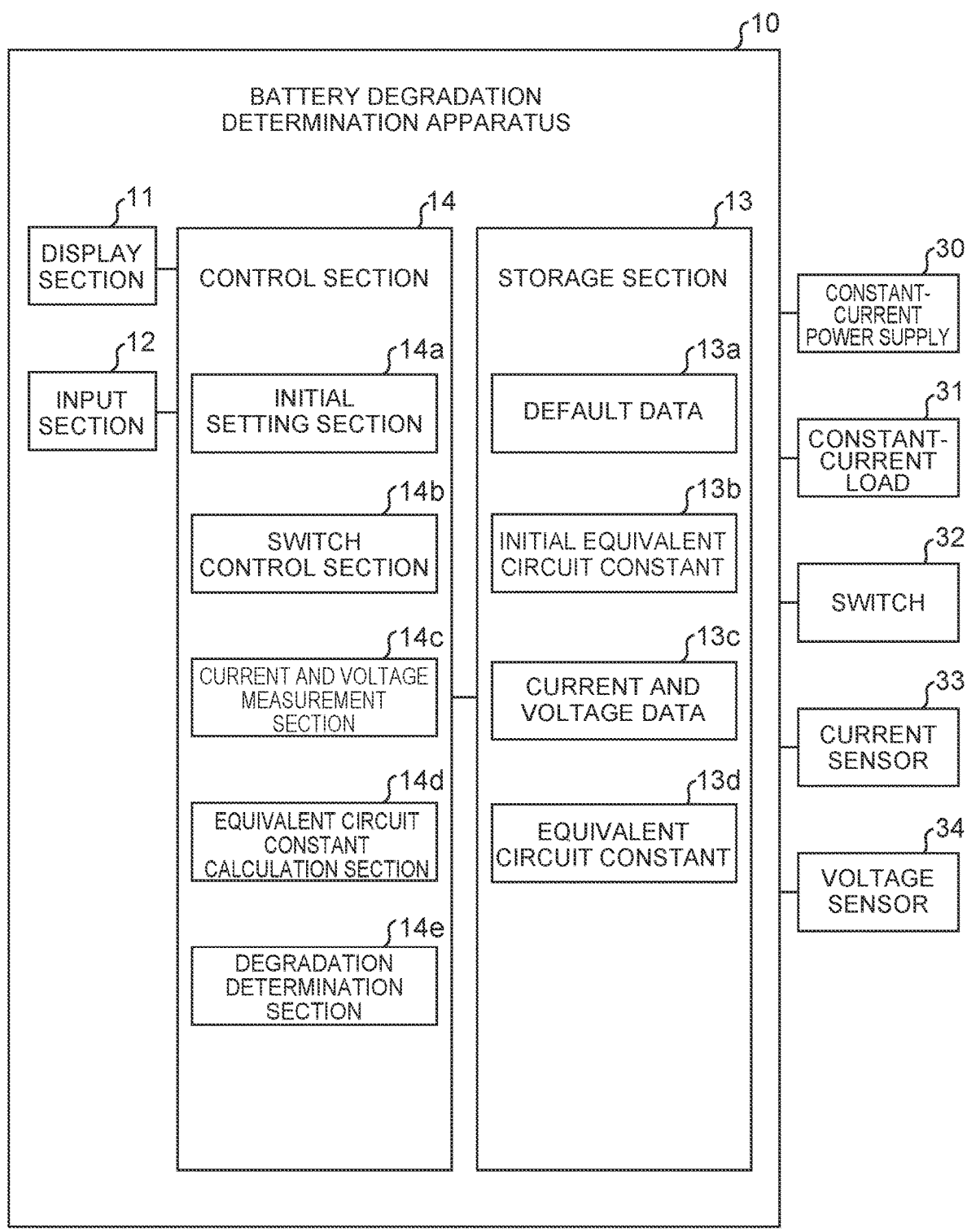
FIG. 4 is a functional block diagram for describing a configuration of a battery degradation determination apparatus shown in FIG. 2.

Next, a configuration of the battery degradation determination apparatus is described. FIG. 4 is a functional block diagram for describing the configuration of the battery degradation determination apparatus 10 shown in FIG. 2. As shown in FIG. 4, the battery degradation determination apparatus 10 includes a display section 11, an input section 12, a storage section 13, and a control section 14. Moreover, the constant-current power supply 30, the constant-current load 31, the switch 32, the current sensor 33, and the voltage sensor 34 are connected to the battery degradation determination apparatus 10.

The display section 11 includes a display device such as a liquid crystal panel or a display unit, and the input section 12 includes an input device such as a numeric keypad or a mouse.

The storage section 13 includes a storage device such as a hard disk device or a non-volatile memory, and stores default data 13a, initial equivalent circuit constant 13b, current and voltage data 13c, and equivalent circuit constant 13d. The default data 13a includes data on default values (for example, the current value is set to 1 A) and the like for the constant-current power supply 30, the constant-current load 31, and the like. The initial equivalent circuit constant 13b includes an initial equivalent circuit constant for the secondary battery 20 that is calculated through a procedure, which will be described later. The current and voltage data 13c includes data on current and voltage of the secondary battery 20 respectively measured by the current sensor 33 and the voltage sensor 34. The equivalent circuit constant 13d includes an equivalent circuit constant for the secondary battery 20 that is calculated through the procedure, which will be described later.

The control section 14 is a control section that controls the entire battery degradation determination apparatus 10, and includes an initial setting section 14a, a switch control section 14b, a current and voltage measurement section 14c, an equivalent circuit constant calculation section 14d, and a degradation determination section 14e. In actuality, a central processing unit (CPU) is caused to perform respective processes corresponding to the initial setting section 14a, the switch control section 14b, the current and voltage measurement section 14c, the equivalent circuit constant calculation section 14d, and the degradation determination section 14e, by loading respective programs thereof into the CPU, and causing the CPU to execute the programs. In other words, the control section 14 includes a processor. That is to say, the battery degradation determination apparatus 10 includes the processor.

The initial setting section 14a performs processing of setting initial parameters on the constant-current power supply 30, the constant-current load 31, and the like. For example, the current value is set to 1 A.

The switch control section 14b performs processing of connecting the constant-current power supply 30 to the secondary battery 20, and processing of connecting the constant-current load 31 to the secondary battery 20. In switch control, the switch is controlled according to a predetermined charging time period and a predetermined discharging time period, and connection of the constant-current power supply 30 or the constant-current load 31 is switched.

The current and voltage measurement section 14c acquires a value of current flowing into the secondary battery 20 when the secondary battery 20 is charged, and acquires a value of current flowing out of the secondary battery 20 when the secondary battery 20 is discharged, from the current sensor 33. The current and voltage measurement section 14c performs processing of acquiring the voltage value at terminals of the secondary battery 20 from the voltage sensor 34, and stores the acquired voltage value as the current and voltage data 13c in the storage section 13.

The equivalent circuit constant calculation section 14d performs processing of calculating equivalent circuit constants including element values of the resistive elements and the capacitive elements of the equivalent circuit shown in FIG. 3, according to a procedure, which will be described later. That is, the equivalent circuit constant in the embodiment includes resistance values of the resistive elements and capacitance values of the capacitive elements in the equivalent circuit.

The degradation determination section 14e compares the initial equivalent circuit constant for the secondary battery 20 with an equivalent circuit constant for the secondary battery 20 subjected to measurement. When a change in equivalent circuit constant is equal to or less than the predetermined threshold value, the degradation determination section 14e determines that the secondary battery 20 is good, and when the change in equivalent circuit constant is greater than the predetermined threshold value, the degradation determination section 14e determines that the secondary battery 20 is defective.

The constant-current power supply 30 is a power supply that applies a constant current set by the initial setting section 14a to the secondary battery 20. The constant-current load 31 is a load that causes a constant current set by the initial setting section 14a to flow from the secondary battery 20. The switch 32 switches between connecting the constant-current power supply 30 to the secondary battery 20 and connecting the constant-current load 31 to the secondary battery 20, at a predetermined time point.

The current sensor 33 is connected to the switch 32 and the secondary battery 20 in series, and measures a value of current flowing into the secondary battery 20 when the secondary battery 20 is charged, and measures a value of current flowing out of the secondary battery 20 when the secondary battery 20 is discharged. The voltage sensor 34 measures the voltage value of the terminal voltage of the secondary battery 20.

Calculation of Equivalent Circuit Constants

Next, calculation of the equivalent circuit constants of the equivalent circuit shown in FIG. 3 is described. For equivalent circuit constants, a plurality of charging characteristics and a plurality of discharging characteristics are acquired by using different sampling time intervals $t_S$, and respective equivalent circuit constants are calculated. Charging and discharging characteristics of the secondary battery 20 are calculated by using, as ultimate equivalent circuit constants, a combination of the plurality of equivalent circuit constants. Here, a case is described where three sampling time intervals t s (ms), i.e., 50 ms, 400 ms, and 900 ms, are used.

First, a charge voltage Vc(t) is obtained. Assuming that the equivalent circuit shown in FIG. 3 is used as an equivalent circuit here, the charge voltage Vc(t) is expressed as an expression (1) when a constant current I is applied to the equivalent circuit.

$$Vc(t) = \sum_{i=0}^{3}\{R_i I + (V0_i - R_i I)e^{-t/\tau_i}\} + DI \quad (1)$$

where $VO_i$ (i=0, 1, 2, 3) is an initial voltage at both terminals of a capacitive element $C_i$ at time t=0, and is a time constant and is defined as $\tau_i = R_i C_i$ (i=0, 1, 2, 3).

Assuming that time t is reset as t=0 at start of discharge, a discharge voltage $V_d(t)$ of the secondary battery 20 is expressed as an expression (2).

$$V_d(t) = VT_0 e^{-t/\tau 0} + VT_1 e^{-t/\tau 1} + VT_2 e^{-t/\tau 2} + VT_3 e^{-t/\tau 3} \quad (2)$$

where $VT_i$ is an initial voltage of each tank circuit when time t=0. Here, when $a_i = VT_i$ (i=0, 1, 2, 3), and $x_i = e^{-t/\tau i}$ (i=0, 1, 2, 3), the discharge voltage $V_d(t)$ is expressed as an expression (3).

$$V_d(t) = a_0 x_0 + a_1 x_1 + a_2 x_2 + a_3 x_3 \quad (3)$$

Here, $V_d(t)$ can be obtained from eight unknowns $a_0$, $a_1$, $a_2$, $a_3$, $x_0$, $x_1$, $x_2$, $x_3$, and therefore the unknowns can be calculated from simultaneous equations using the unknowns, by using algebraic calculation or numerical calculation. When $a_0$, $a_1$, $a_2$, $a_3$, $x_0$, $x_1$, $x_2$, $x_3$ are obtained, the resistive elements D, $R_i$ and the capacitive elements $C_i$ of the equivalent circuit shown in FIG. 3 can be calculated.

Figure 5:
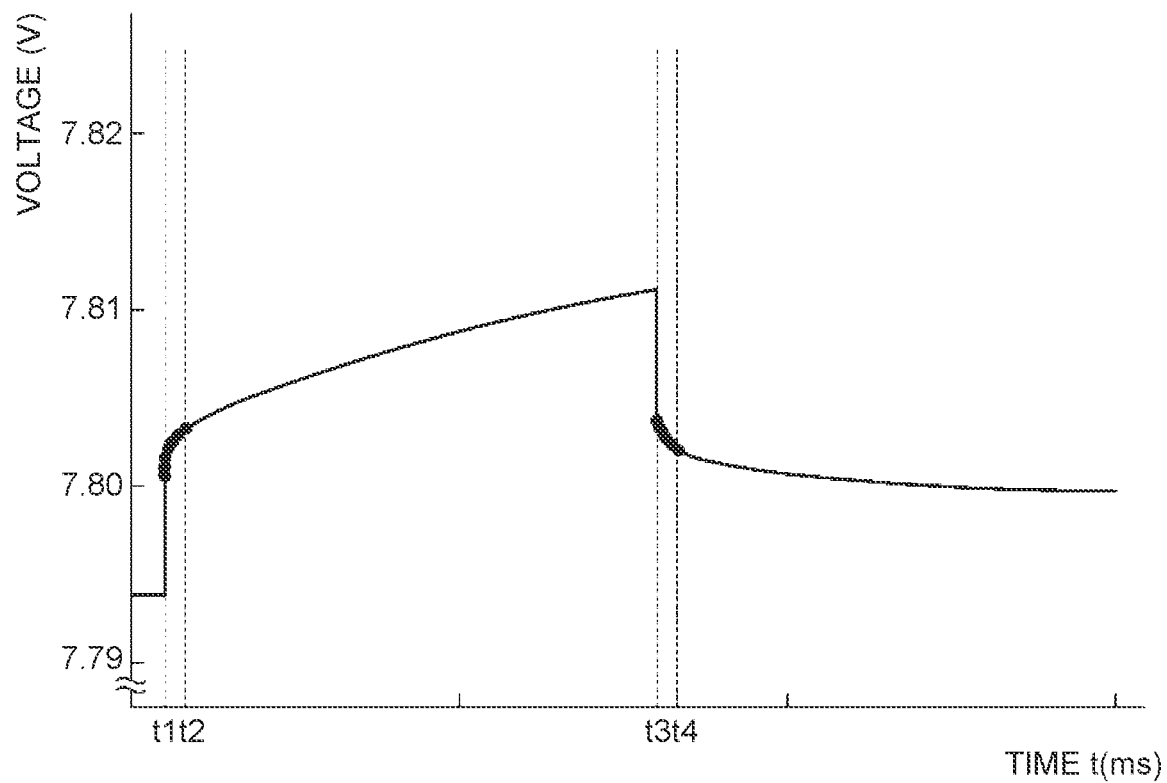
FIG. 5 shows an example of charging and discharging characteristics and measurement points when a sampling time interval $t_S$=50 ms.

Next, acquisition of a voltage characteristic to calculate the equivalent circuit is described. FIG. 5 shows an example of charging and discharging characteristics and measurement points when the sampling time interval $t_S$=50 ms. As shown in FIG. 5, voltage is measured at sampling time intervals of 50 ms, from t1, which is a time of start of charge, up to t2. Note that here, a case is described where the charging time period is 8000 ms, and the discharging time period is 8000 ms. Assuming that t1=0 ms, then t2=350 ms, t3=8000 ms, and t4=8350 ms when the sampling time interval $t_S$=50 ms.

In the measurement, equivalent circuit constants can be calculated in a portion where changes in voltage become gentle after the voltage rapidly rises in an early stage of the charging and discharging characteristics.

Figure 6:
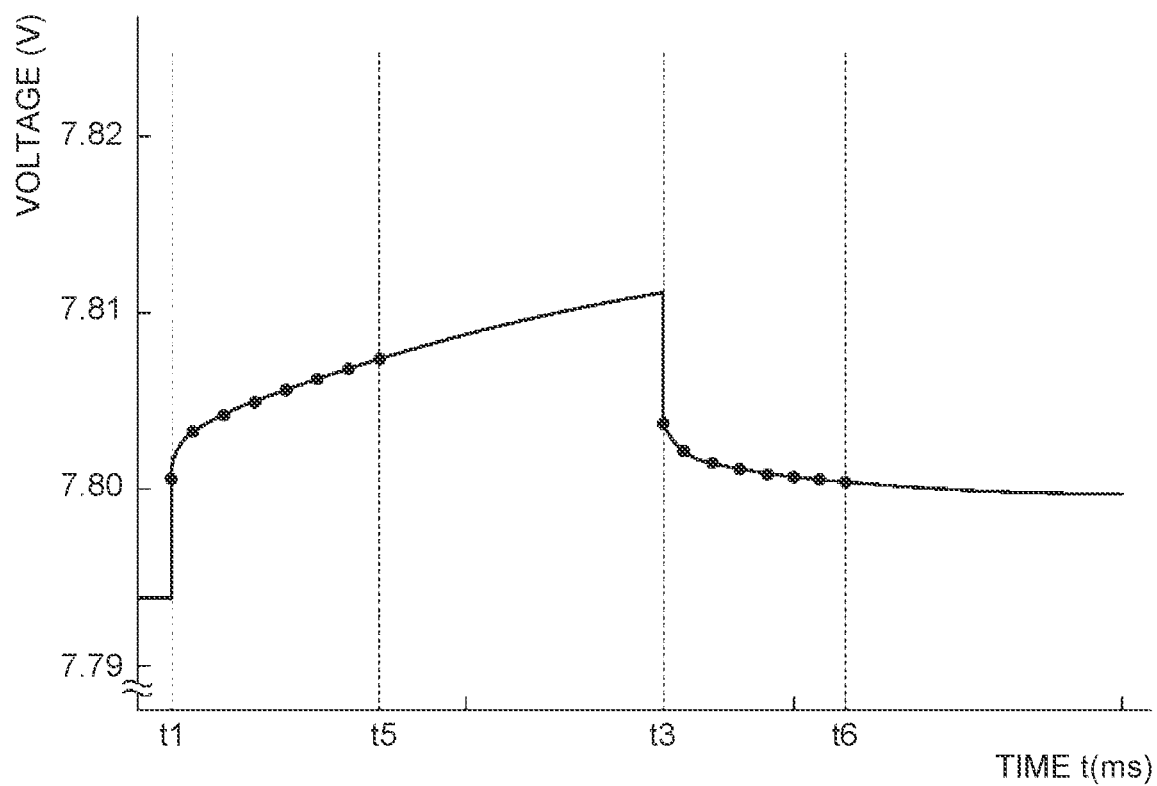
FIG. 6 shows an example of charging and discharging characteristics and measurement points when the sampling time interval $t_S$=400 ms.

Next, description is provided regarding measurement points in a case where charging and discharging characteristics are measured when the sampling time interval $t_S$=400 ms. FIG. 6 shows an example of the charging and discharging characteristics and the measurement points when the sampling time interval $t_S$=400 ms. As shown in FIG. 6, voltage is measured at sampling time intervals $t_S$ of 400 ms, from t1, which is a time of start of charge, up to t5. When the sampling time interval $t_S$=400 ms, t5=2800 ms, and t6=10800 ms.

In the measurement, it is possible to calculate equivalent circuit constants in a portion where the voltage changes from an early stage to a middle stage of the charging and discharging characteristics.

Figure 7:
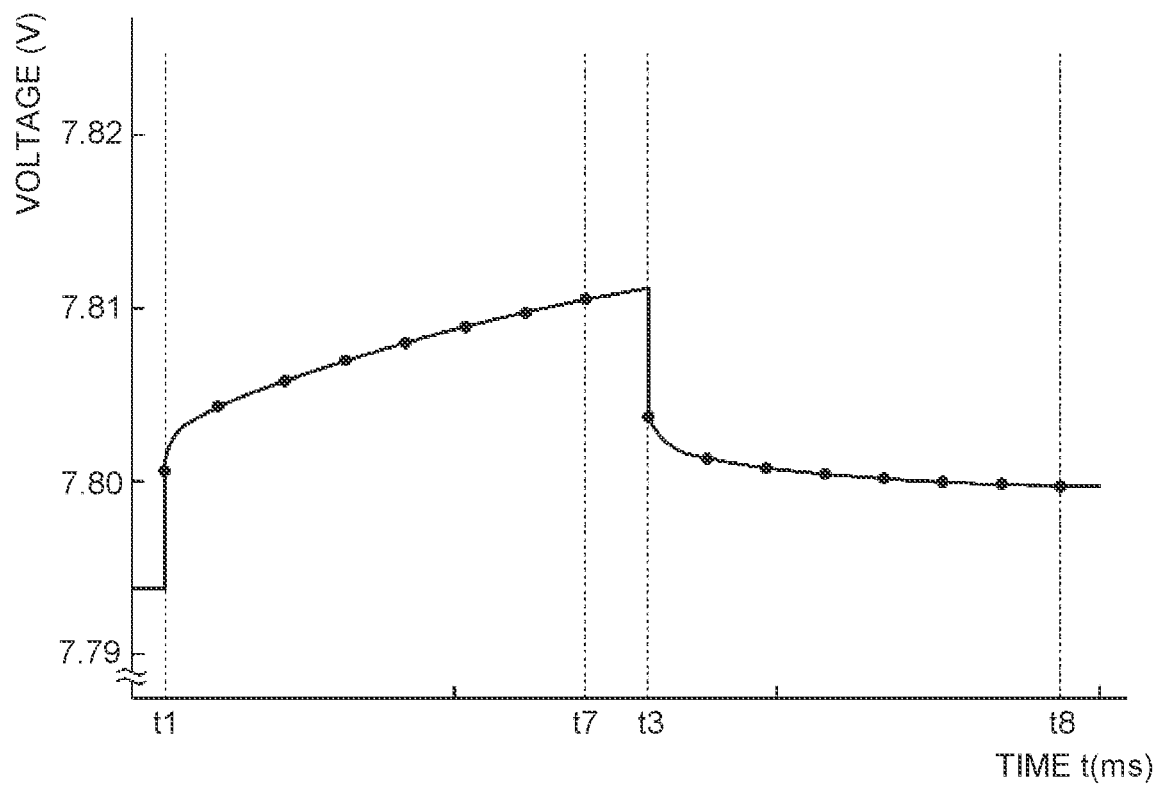
FIG. 7 shows an example of charging and discharging characteristics and measurement points when the sampling time interval $t_S$=900 ms.

Next, description is provided regarding measurement points in a case where charging and discharging characteristics are measured when the sampling time interval $t_S$=900 ms. FIG. 7 shows an example of the charging and discharging characteristics and the measurement points when the sampling time interval $t_S$=900 ms. As shown in FIG. 7, voltage is measured at sampling time intervals $t_S$ of 900 ms, from t1, which is a time of start of charge, up to t7. When the sampling time interval $t_S$=900 ms, t7=6300 ms, and t8=14300 ms.

In the measurement, it is possible to calculate equivalent circuit constants in a portion of the charging and discharging characteristics where the voltage gently changes.

Next, description is provided regarding the equivalent circuit constants that are calculated based on measured values of the charging and discharging characteristics measured by using the different sampling time intervals $t_S$. FIG. 8 shows an example of the equivalent circuit constants based on the measured values measured by using the different sampling time intervals $t_S$.

As shown in FIG. 8, when the sampling time interval $t_S$=0.05 s, the equivalent circuit constants (time constants) are $\tau_0$=3866.9 s, $\tau_1$=0.063632 s, and $\tau_2$=0.0061280 s. When the sampling time interval $t_S$=0.4 s, the equivalent circuit constants (time constants) are $\tau_0$=36536 s, $\tau_1$=0.93965 s, and $\tau_2$=0.12048 s. When the sampling time interval $t_S$=0.9 s, the equivalent circuit constants are $t_0$=71567 s, $\tau_1$=1.692 s, and $\tau_2$=0.24380 s. As described above, the equivalent circuit constant (time constant) changes with time.

For an equivalent circuit model for the secondary battery 20, an equivalent circuit model is considered while continuity of the voltage value at both terminals of each tank circuit is taken into account, because the equivalent circuit constant (time constant) changes with time. Here, when an extremely small interval is denoted by $\Delta t$, it is assumed that the time constant $\tau_1(t)$ is unchanged in the extremely small interval, in the expressions (1) and (2).

First, in a portion of discharge, it is assumed that a time when discharge is started after the secondary battery 20 is charged is set as t=0, that a voltage between tank circuits at time t is $V_i(t)$ (i=0, 1, 2, 3), and that the time constant is $t_i(t)$ (i=0, 1, 2, 3). When time $t_1$ and time $t_2$ are sufficiently close to each other, a voltage $V_i(t_2)$ between tank circuits at $t_2$ is expressed by using a voltage $V_i(t_1)$ between tank circuits at time $t_1$, as an expression (4).

$$V_i(t_2) = V_i(t_1)e^{-\frac{t_2-t_1}{\tau_i(t_1)}} \quad (4)$$

In the expression (4), by assuming, with respect to a positive integer n=0, 1, 2, . . . , that $t_1$=n$\Delta t$ and $t_2$=(n+1)$\Delta t$, a voltage $V_d((n+1)\Delta t)$ of the secondary battery 20 at time $(n+1)\Delta t$ is expressed by using a voltage $V_i(n\Delta t)$ between tank circuits at time $n\Delta t$, as an expression (5). Note that the time constant of each sub-tank circuit is assumed to be unchanged here.

$$V_d((n+1)\Delta t) = V_0(n\Delta t)e^{-\frac{\Delta t}{\tau_0(n\Delta t)}} + \sum_{i=1}^{3} V_i(n\Delta t)e^{-\frac{\Delta t}{\tau_i}} \quad (5)$$

An expression (6) is obtained when $\tau_0(n\Delta t)$ is derived from the expression (5).

$$\tau_0(n\Delta t) = -\frac{\Delta t}{\log\left\{\frac{1}{V_0(n\Delta t)}\left(V_d(n(n+1)\Delta t) - \sum_{i=1}^{3} V_i(n\Delta t)e^{-\frac{\Delta t}{\tau_i}}\right)\right\}} \quad (6)$$

The time constant $\tau_0(n\Delta t)$ can be obtained from the expression (6) by obtaining the time constant $\tau_i$ of each sub-tank circuit, and a voltage $V_i(0)$ between tank circuits when time t=0.

Figure 9:
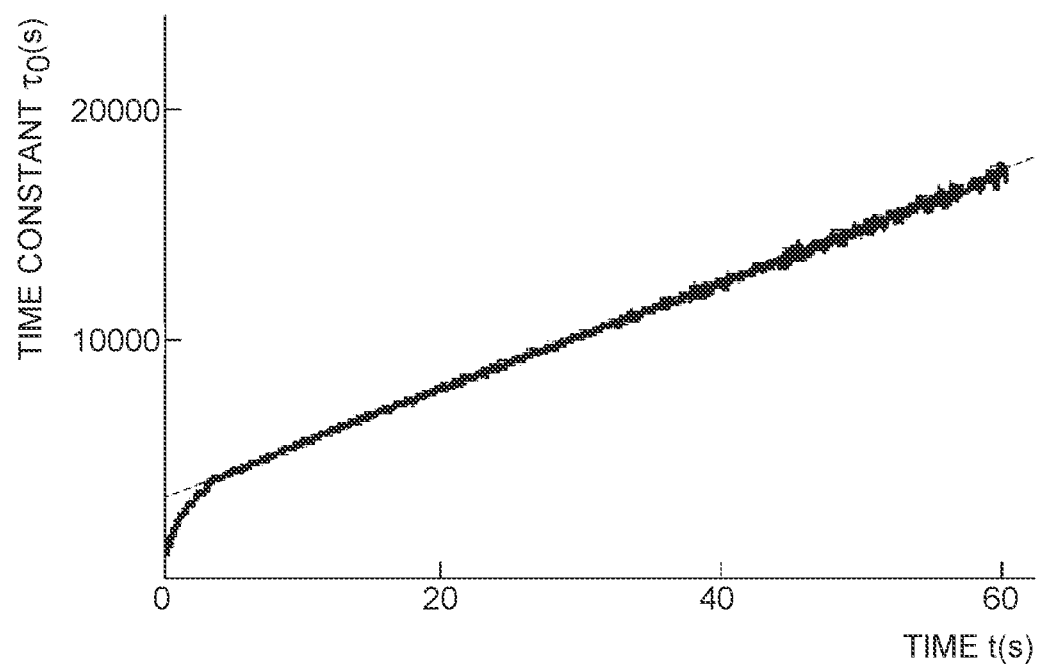
FIG. 9 shows an example of changes in time constant with time.

FIG. 9 shows an example of the time constant m obtained when numerical calculation is performed by using the expression (6), based on a charging and discharging curve representing actually measured charging and discharging characteristics of the secondary battery 20. As shown in FIG. 9, it can be seen that the time constant $\tau_0$ of the main tank circuit is a linear function of time. Note that in a range from start of discharge up to a predetermined time period (for example, eight seconds) later on the discharging characteristic, the time constant $\tau_0(t)$ cannot be represented by the linear function of time, and is therefore obtained by, for example, successive approximation using a logarithmic curve.

Figure 10:
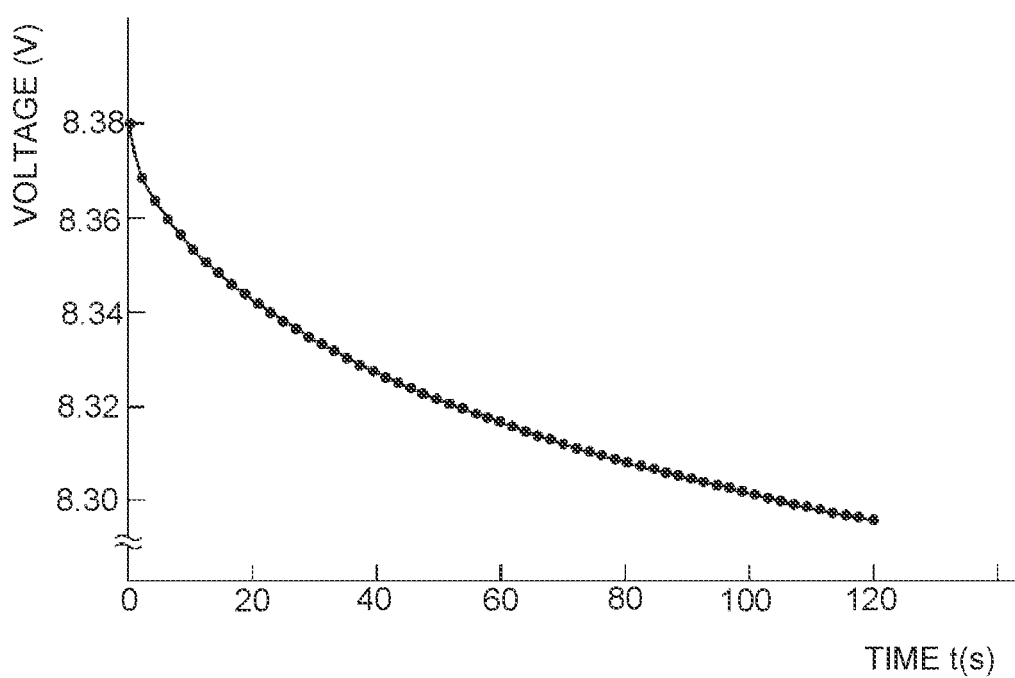
FIG. 10 shows an example of a discharging characteristic of a secondary battery.

Next, a discharging characteristic is shown that is calculated based on the time constant $\tau_0$ that changes with time. FIG. 10 shows an example of the discharging characteristic of the secondary battery. As shown in FIG. 10, the discharging characteristic obtained based on the time constant $\tau_0$ that changes with time exhibits a characteristic that is substantially similar to actually measured values.

The time constant in a portion of charge is represented by a linear function of time after a predetermined time period, as in the portion of discharge. From start of charge up to the predetermined time period (for example, 20 seconds) later, the time constant is obtained by performing fitting using a logarithmic curve or the like. Then, an equivalent circuit model is created by obtaining a voltage formula that calculates a charge voltage and a discharge voltage, by using the obtained time constants in the portion of charge and the portion of discharge.

Degradation Determination for Secondary Battery 20

Figure 11:
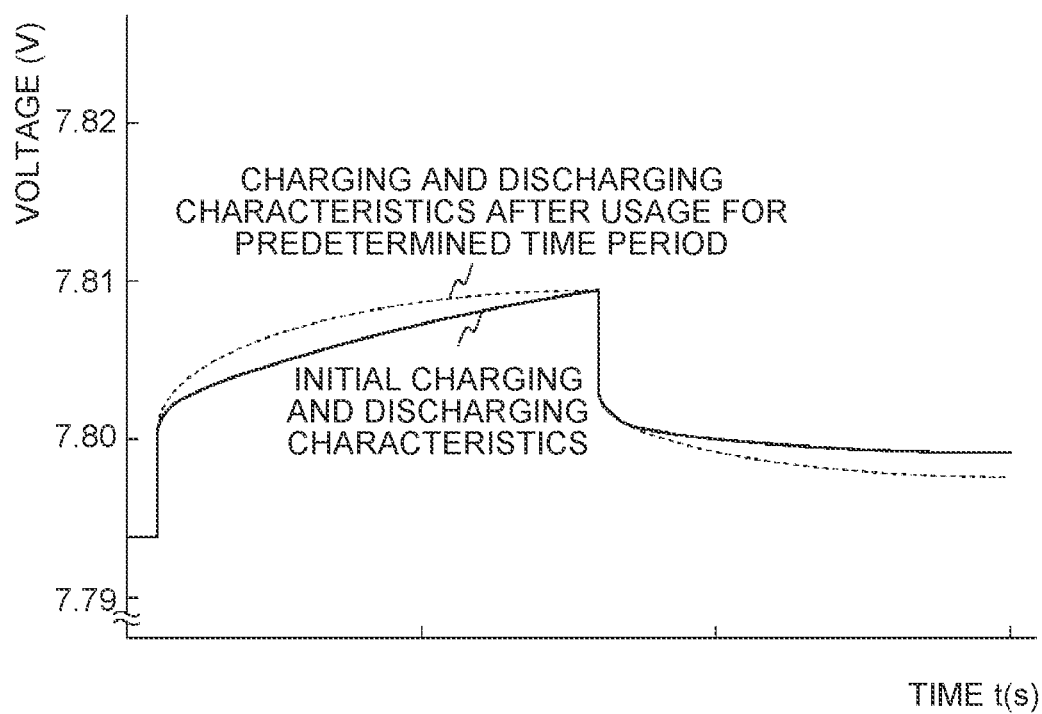
FIG. 11 shows an example of comparison between initial charging and discharging characteristics of a secondary battery and charging and discharging characteristics of the secondary battery after usage for a predetermined time period.

Next, degradation determination for the secondary battery 20 is described. FIG. 11 shows an example of comparison between initial charging and discharging characteristics of the secondary battery 20 and charging and discharging characteristics of the secondary battery 20 after usage for a predetermined time period. As shown in FIG. 11, the charging and discharging characteristics of the secondary battery 20 after usage for the predetermined time period show that voltage rises fast as compared to the initial characteristics of the secondary battery 20, and also show that in a case of discharge, voltage drops fast as compared to the initial characteristics of the secondary battery 20.

The battery degradation determination apparatus 10 calculates an equivalent circuit constant, based on the charging and discharging characteristics of the secondary battery 20 after usage for the predetermined time period, compares the calculated equivalent circuit constant with the initial equivalent circuit constant, and determines degradation of the secondary battery 20, based on whether or not a change in equivalent circuit constant is equal to or less than the predetermined threshold value.

Specifically, the equivalent circuit constant for the secondary battery 20 after usage for the predetermined time period and the initial equivalent circuit constant for the secondary battery 20 are compared. When the change is equal to or less than the predetermined threshold value, it is determined that the secondary battery 20 is good, and when the change is greater than the predetermined threshold value, it is determined that the secondary battery 20 is defective.

Procedure of Processing Performed by Battery Degradation Determination Apparatus 10

Figure 12:
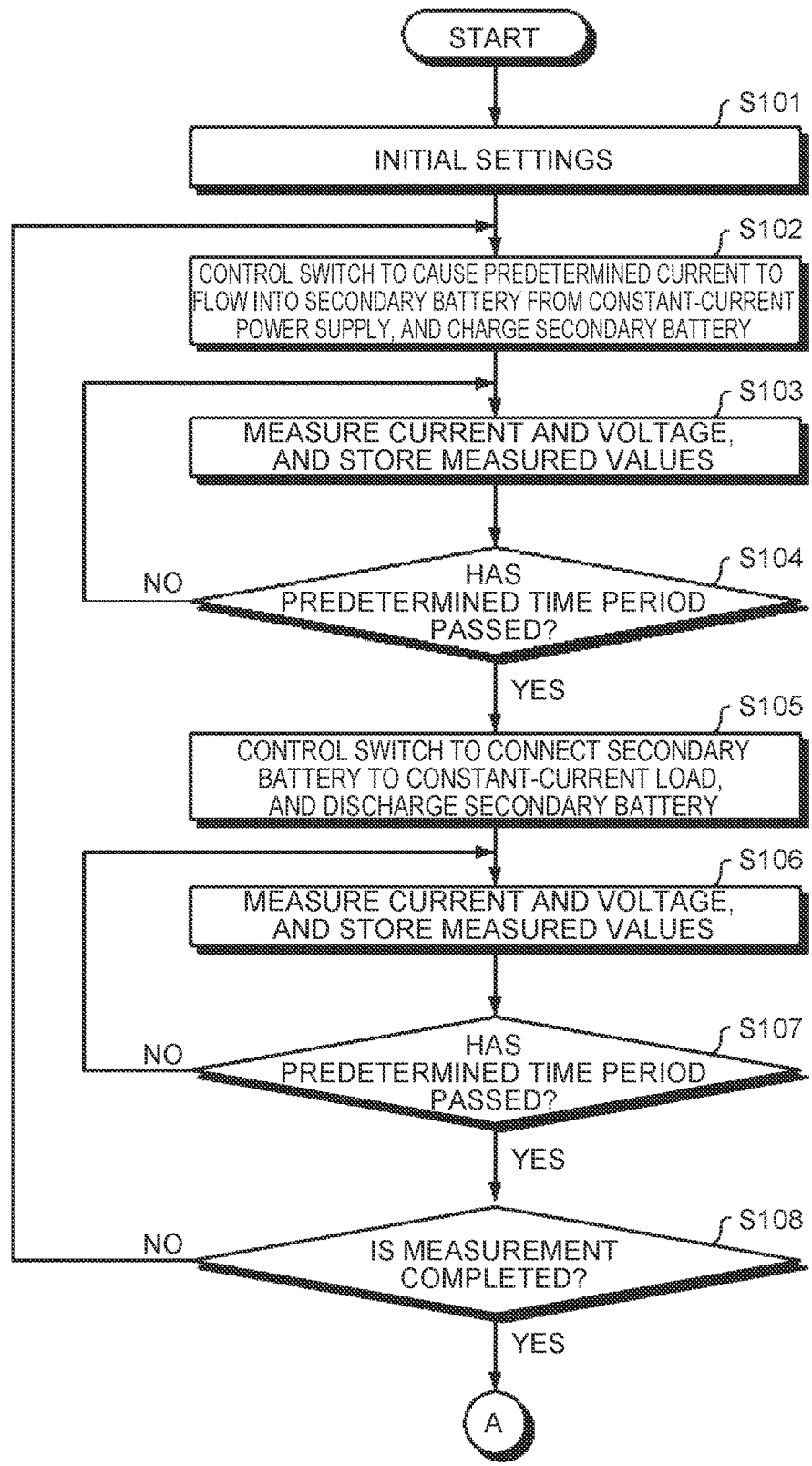
FIG. 12 is a flowchart (no. 1) showing a procedure of processing performed by the battery degradation determination apparatus shown in FIG. 2.
Figure 13:
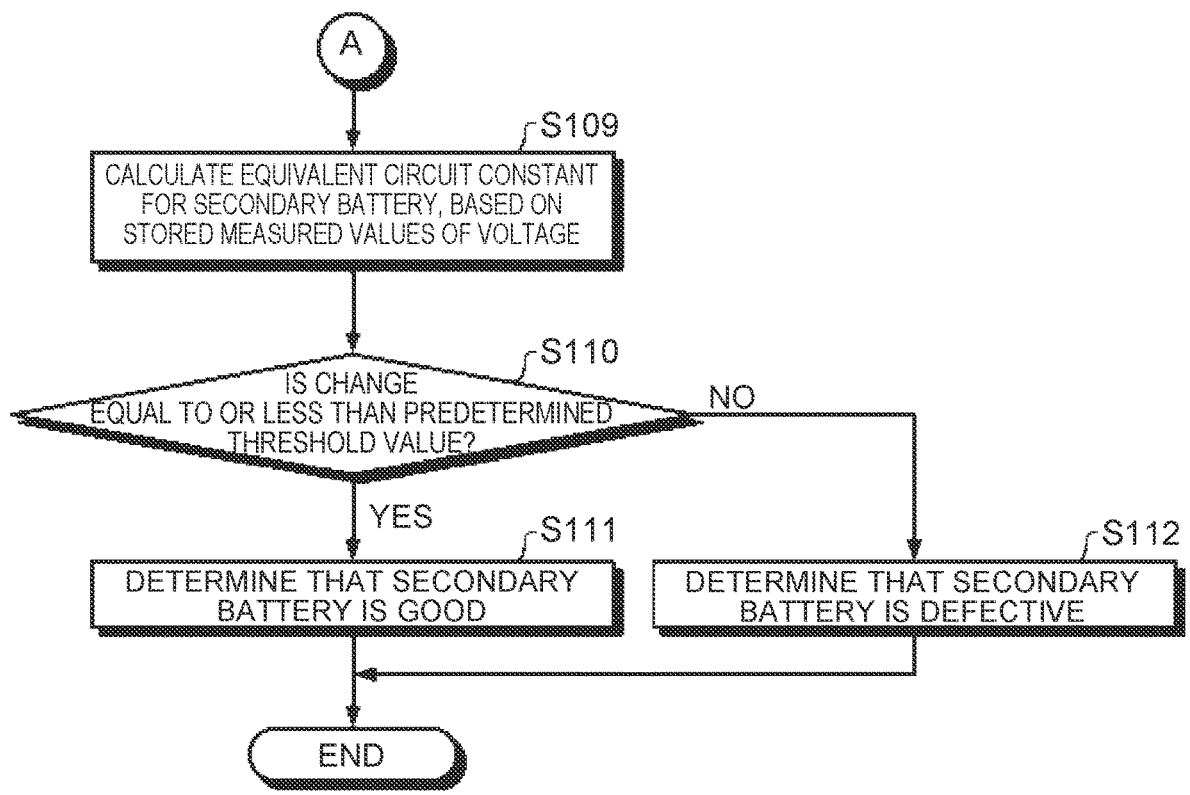
FIG. 13 is a flowchart (no. 2) showing the procedure of processing performed by the battery degradation determination apparatus shown in FIG. 2.

Next, a procedure of processing performed by the battery degradation determination apparatus 10 is described. FIGS. 12 and 13 are flowcharts showing the procedure of processing performed by the battery degradation determination apparatus 10 shown in FIG. 2. As shown in FIG. 12, the battery degradation determination apparatus 10 first performs initial settings of a current value and the like on each of the constant-current power supply 30 and the constant-current load 31 (step S101).

The battery degradation determination apparatus 10 controls the switch 32 to connect the constant-current power supply 30 to the secondary battery 20, and the secondary battery 20 is charged with a predetermined constant current (step S102). The battery degradation determination apparatus 10 acquires current values and voltage values from the current sensor 33 and the voltage sensor 34, and stores the measured values as the current and voltage data 13c in the storage section 13 (step S103).

The battery degradation determination apparatus 10 determines whether or not a predetermined time period has passed (step S104), and when the predetermined time period has not passed (step S104: No), the battery degradation determination apparatus 10 proceeds to step S103 and continues measurement. Here, the predetermined time period is, for example, 350 ms when the sampling time interval $t_S=50$ ms, 2800 ms when the sampling time interval $t_S=400$ ms, and 6300 ms when the sampling time interval $t_S=900$ MS.

When the predetermined time period has passed (step S104; Yes), the battery degradation determination apparatus 10 controls the switch 32 to connect the secondary battery 20 to the constant-current load 31, and the secondary battery 20 is discharged at a predetermined current (step S105). The battery degradation determination apparatus 10 acquires current values and voltage values from the current sensor 33 and the voltage sensor 34, and stores the measured values as the current and voltage data 13c in the storage section 13 (step S106).

The battery degradation determination apparatus 10 determines whether or not a predetermined time period has passed (step S107), and when the predetermined time period has not passed (step S107; No), the battery degradation determination apparatus 10 proceeds to step S106 and continues measurement.

When the predetermined time period has passed (step S107; Yes), the battery degradation determination apparatus 10 determines whether or not measurement using a different sampling time interval is completed (step S108). When the measurement is not completed (step S108; No), the battery degradation determination apparatus 10 proceeds to step S102, and measures charging and discharging characteristics by using the different sampling time interval.

When the measurement using the different sampling time interval is completed (step S108; Yes), the battery degradation determination apparatus 10 calculates an equivalent circuit constant for the secondary battery 20, based on the stored measured values of voltage (step S109). The battery degradation determination apparatus 10 compares the calculated equivalent circuit constant with the initial equivalent circuit constant 13b, and determines whether or not a change in equivalent circuit constant is equal to or less than the predetermined threshold value (step S110).

When the change in equivalent circuit constant is equal to or less than the predetermined threshold value (step S110; Yes), it is determined that the secondary battery is good (step S111), and the series of processing is terminated. When the change in equivalent circuit constant is greater than the predetermined threshold value (step S110; No), it is determined that the secondary battery 20 is defective (step S112), and the series of processing is terminated.

As described above, in the present embodiment, voltage values for charging and discharging characteristics are measured using a plurality of different sampling time intervals, and equivalent circuit constants of the equivalent circuit shown in FIG. 3 are calculated based on the measured values. Then, a time constant of the main tank circuit that changes with time is calculated, an equivalent circuit model based on the time constant is created, the initial equivalent circuit constant 13b for the secondary battery obtained when the secondary battery 20 is new and the equivalent circuit constant 13d for the secondary battery 20 after usage for a predetermined time period are compared, and degradation of the secondary battery 20 is determined based on whether or not a change in equivalent circuit constant is equal to or less than the predetermined threshold value. With the configuration thus made, accuracy of charging and discharging characteristics calculated from the equivalent circuit can be increased, and thus, degradation of the secondary battery 20 can be determined efficiently.

Note that although a case is described where a constant current caused to flow for charge and discharge is fixed in the embodiment, the disclosure is not limited to such a case. The current value of a constant current caused to flow for charge and discharge may be changed, for example, to 1 A, 2 A, and 3 A, and equivalent circuit constants may be calculated by using the current value as a parameter.

Each configuration shown in the drawings in each of the embodiments is a functional and schematic configuration, and a configuration does not necessarily need to be physically made as shown in the drawings. In other words, forms of distribution and integration of apparatuses and devices are not limited to the forms shown in the drawings, and a configuration can be made by functionally or physically distributing or integrating all of or parts of apparatuses and devices in any units, depending on various loads, usage conditions, and the like.

The battery degradation determination system, the battery degradation determination apparatus, and the battery degradation determination method according to the disclosure are suitable when degradation determination is performed for a secondary battery quickly and efficiently.

What is claimed is:

1. A battery degradation determination system comprising a battery degradation determination apparatus configured to perform degradation determination for a battery, wherein:
   the battery degradation determination apparatus includes a processor; and
   the processor is configured to:
     measure a charging and discharging characteristic value of the battery;
     calculate a first equivalent circuit constant in an equivalent circuit for the battery in which a power supply is a main tank circuit including a first resistive element and a first capacitive element that are connected in parallel, based on the measured charging and discharging characteristic value, the equivalent circuit including no constant-voltage power supply; and
     perform the degradation determination for the battery, based on at least the first equivalent circuit constant that is calculated.

2. The battery degradation determination system according to claim 1, wherein:
   the battery degradation determination apparatus further includes a storage that stores a second equivalent circuit constant obtained prior to shipment of the battery; and
   the processor is configured to perform the degradation determination for the battery, based on the first equivalent circuit constant that is calculated and the second equivalent circuit constant that is stored in the storage.

3. The battery degradation determination system according to claim 2, wherein the processor is configured to perform the degradation determination for the battery, based on whether or not a difference between the first equivalent circuit constant and the second equivalent circuit constant is greater than a predetermined threshold value.

4. The battery degradation determination system according to claim 1, wherein the equivalent circuit has a circuit configuration in which the main tank circuit, a second resistive element, and a plurality of sub-tank circuits are connected in series, each of the plurality of sub-tank circuits including a third resistive element and a second capacitive element that are connected in parallel.

5. The battery degradation determination system according to claim 4, wherein the first equivalent circuit constant includes a resistance value of the first resistive element, a capacitance value of the first capacitive element, a resistance value of the second resistive element, a resistance value of the third resistive element, and a capacitance value of the second capacitive element.

6. The battery degradation determination system according to claim 1, wherein the processor is configured to measure a plurality of charging and discharging characteristic values by using a plurality of different sampling time intervals, and to calculate the first equivalent circuit constant that changes with time, based on the plurality of charging and discharging characteristic values.

7. The battery degradation determination system according to claim 1, wherein the battery degradation determination apparatus determines degradation when at least one of the following conditions occurs: (i) the first equivalent circuit constant indicates such a charging characteristic of the battery during charge that shows voltage rises fast compared with a charging characteristic of the battery prior to the shipment of the battery; and (ii) the first equivalent circuit constant indicates such a discharging characteristic of the battery during discharge that shows voltage drops fast compared with a discharging characteristic of the battery prior to the shipment of the battery.

8. The battery degradation determination system according to claim 1, wherein
the equivalent circuit has a circuit configuration in which the main tank circuit is connected in series to a second resistive element and at least a first sub-tank circuit and a second sub-tank circuit, and
the first sub-tank circuit is a circuit in which a third resistive element and a second capacitive element are connected in parallel, and the second sub-tank circuit is a circuit in which a fourth resistive element and a third capacitive element are connected in parallel.

9. The battery degradation determination system according to claim 8, wherein the first equivalent circuit constant includes a resistance value of the first resistive element, a capacitance value of the first capacitive element, a resistance value of the second resistive element, resistance values of at least the third resistive element and the fourth resistive element, and capacitance values of at least the second capacitive element and the third capacitive element.

10. The battery degradation determination system according to claim 1, further comprising a constant-current power supply.

11. The battery degradation determination system according to claim 1, further comprising a constant-current load.

12. The battery degradation determination system according to claim 1, wherein the battery is a battery that has been removed from a vehicle.

13. A battery degradation determination apparatus configured to perform degradation determination for a battery, the battery degradation determination apparatus comprising a processor configured to:
measure a charging and discharging characteristic value of the battery;
calculate a first equivalent circuit constant in an equivalent circuit for the battery in which a power supply is a main tank circuit including a first resistive element and a first capacitive element that are connected in parallel, based on the measured charging and discharging characteristic value, the equivalent circuit including no constant-voltage power supply; and
perform the degradation determination for the battery, based on at least the first equivalent circuit constant that is calculated.

14. A battery degradation determination method for a battery degradation determination system including a battery degradation determination apparatus configured to perform degradation determination for a battery, the battery degradation determination method comprising:
measuring, by the battery degradation determination apparatus, a charging and discharging characteristic value of the battery;
calculating, by the battery degradation determination apparatus, a first equivalent circuit constant in an equivalent circuit for the battery in which a power supply is a main tank circuit including a first resistive element and a first capacitive element that are connected in parallel, based on the measured charging and discharging characteristic value, the equivalent circuit including no constant-voltage power supply; and
performing, by the battery degradation determination apparatus, the degradation determination for the battery, based on at least the first equivalent circuit constant that is calculated.

* * * * *